United States Patent Office 3,260,740
Patented July 12, 1966

3,260,740
SALTS OF α-METHYLBENZYLHYDRAZINE WITH PHARMACEUTICALLY ACCEPTABLE SULPHONATED POLYSTYRENE RESINS
Albert Frederick Crowther and Edwin Harry Paterson Young, both of Macclesfield, England, assignors to Imperial Chemical Industries Limited, London, England, a corporation of Great Britain
No Drawing. Filed Sept. 17, 1964, Ser. No. 397,282
Claims priority, application Great Britain, Dec. 23, 1958, 41,454/58; June 22, 1959, 21,291/59
1 Claim. (Cl. 260—501)

This application is a continuation-in-part of Serial No. 852,951, filed November 16, 1959, the subject matter of said earlier application being incorporated herein by reference.

This invention relates to new α-methylbenzylhydrazine salts that are stable and effective as anti-depressants and stimulants.

There has been considerable interest in recent years in aralkylhydrazine derivatives which are non-toxic and which have monoamine oxidase inhibitory properties, for possible use as anti-depressants and stimulants. α-Methylbenzylhydrazine and its acid-addition salts with common inorganic and organic acids, for example sulphuric acid and tartaric acid, are highly effective monoamine oxidase inhibitors, but unfortunately these compounds have the defect that they tend to be unstable. Thus, the following table indicates the instability of α-methylbenzylhydrazine and of some of its acid-addition salts when stored under normal conditions at ambient temperature:

| Compound | Remarks |
| --- | --- |
| α-Methylbenzylhydrazine | Began to decompose immediately. |
| α-Methylbenzylhydrazine sulphate | Decomposed within 1-2 weeks. |
| α-Methylbenzylhydrazine sulphite | Decomposed within 3 days. |
| α-Methylbenzylhydrazine tartrate | Decomposed within 1 week. |
| α-Methylbenzylhydrazine adipate | Decomposed within 1 day. |
| α-Methylbenzylhydrazine succinate | Decomposed within 2 hours. |

Because of this instability, difficulties are encountered in formulating these compounds, and pharmaceutical compositions containing these compounds have an inadequate shelf-life.

There has, therefore, been considerable research carried out in an effort to find derivatives of α-methylbenzylhydrazine which do not possess the abovementioned instability but which at the same time are non-toxic and effective monoamine oxidase inhibitors. There has been some success in this research; thus, in United Kingdom patent specification No. 904,681 there are described α-lower alkyl-benzylhydrazine derivatives that are stable and have some monoamine oxidase inhibitory properties. These compounds have the following general formula:

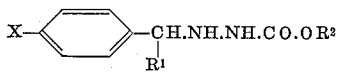

wherein X stands for hydrogen, halogen, hydroxy or lower alkoxy ($C_1$-$C_4$), $R^1$ stands for lower alkyl ($C_1$-$C_4$), and $R^2$ stands for lower alkyl ($C_1$-$C_4$) or for a group of the formula $C_nH_{2n}Y$ wherein $n$ is 2 or 3 and Y is chlorine, hydroxy, di-lower alkylamino ($C_1$-$C_4$), piperidino, piperazino, morpholino or pyrrolidino. However, the monoamine oxidase inhibitory activity of these compounds is much less than that of the corresponding parent hydrazine derivatives. Thus, the $ED_{15}$ values (Spinks and Young, "Proceedings of First International Pharmacological Meeting," volume 7, Pergamon Press, Oxford, 1963) for α-methylbenzylhydrazine itself and for some compounds that are the subject of the said United Kingdom specification are as follows:

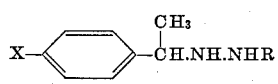

| X | R | $ED_{15}$ (mg./kg.) |
| --- | --- | --- |
| H | H | 5 i.p.; 11 p.o. |
| H | —CO.OCH₃ | 38 p.o. |
| H | —CO.OC₂H₅ | 29 p.o. |
| 4-CH₃O | —CO.OC₂H₅ | >100 p.o. |
| 4-HO | —CO.OC₂H₅ | Not active at 100 p.i. |
| 4-Cl | —CO.OC₂H₅ | Not cative at 100 p.o. |

It will be seen from this table that α-methylbenzylhydrazine (i.e. where X and R are both hydrogen) is much more active than any of the other listed derivatives.

It is, therefore, a particular object of this invention to provide derivatives of α-methylbenzylhydrazine which are stable and at the same time have the same degree of monoamine oxidase inhibitory action as does α-methylbenzylhydrazine itself.

We have found that acid-addition salts of α-methylbenzylhydrazine with pharmaceutically-acceptable sulphonated polystyrene resins are highly effective monoamine oxidase inhibitors, and in particular have the same degree of activity as does α-methylbenzylhydrazine, and at the same time these salts have a high degree of stability. Thus, in contrast to the stability results quoted above, when an α-methylbenzylhydrazine salt with a pharmaceutically-acceptable sulphonated polystyrene resin is stored under normal conditions at ambient temperature, no significant decomposition occurs within 8 months.

According to the invention, therefore, we provide salts of α-methylbenzylhydrazine with pharmaceutically-acceptable acidic resins.

As suitable acidic resins there may be mentioned, for example, pharmaceutically-acceptable sulphonated polystyrene resins and, in particular, pharmaceutically-acceptable sulphonated cross-linked polystyrene resins, for example the resins that are commercially available under the names "Zeo-Karb" 225 ("Zeo-Karb" is a trademark) and "Dowex" 50X ("Dowex" is a trademark).

The salts of this invention are conveniently obtained by the interaction of α-methylbenzylhydrazine, or a salt thereof with a relatively commonly-used acid, with a pharmaceutically-acceptable acidic resin by conventional techniques. The interaction may conveniently be carried out in an aqueous medium. Acid-addition salts of α-methylbenzylhydrazine which may be used as starting materials include, for example, the sulphate and the oxalate.

The invention is illustrated but not limited by the following examples in which the parts are by weight:

*Example 1*

4.6 parts of a sulphonated polystyrene resin ("Zeo-Karb" 225—the word "Zeo-Karb" is a trademark), of particle size 50 microns, are added to a solution of 2 parts of α-methylbenzylhydrazine sulphate in 50 parts of water. The mixture thus obtained is stirred and filtered, and the solid residue is washed with water and then dried. There is thus obtained an α-methylbenzylhydrazine salt of sulphonated polystyrene with an α-methylbenzylhydrazine content of 35%.

Example 2

4 parts of a sulphonated polystyrene resin ("Dowex" 50X—the word "Dowex" is a trademark), of particle size 100–200 microns, are added to a solution of 2.26 parts of α-methylbenzylhydrazine oxalate in 100 parts of water. The mixture thus obtained is stirred and filtered and the solid residue is washed wth water and then dried. There is thus obtained an α-methylbenzylhydrazine salt of sulphonated polystyrene with an α-methylbenzylhydrazine content of 31%.

The products described herein may be used as antidepressants and stimulants as described in Serial No. 852,951.

What we claim is:

A salt of α-methylbenzylhydrazine with a pharmaceutically-acceptable sulphonated polystyrene resin.

References Cited by the Examiner

UNITED STATES PATENTS

| | | | |
|---|---|---|---|
| 2,970,053 | 1/1961 | Martin et al. | 167—72 |
| 2,990,332 | 6/1961 | Keating | 167—72 |

OTHER REFERENCES

Biel et al., Annal. of N.Y. Acad. of Sci., vol. 80, Art. 3, 1959, Conference, November 1958, pp. 568–9, 575–6.

Chessin et al., op. cit., 597–602.

LORRAINE A. WEINBERGER, *Primary Examiner.*

B. EISEN, M. WEBSTER, *Assistant Examiners.*